United States Patent
Koseki et al.

(10) Patent No.: US 9,650,220 B2
(45) Date of Patent: May 16, 2017

(54) SHEET FEEDING APPARATUS AND IMAGE FORMING APPARATUS

(71) Applicant: CANON KABUSHIKI KAISHA, Tokyo (JP)

(72) Inventors: Manabu Koseki, Sakuragawa (JP); Takayuki Iikura, Kashiwa (JP); Shuji Obata, Noda (JP); Mitsuhiro Sugeta, Abiko (JP); Kazunori Miyake, Abiko (JP); Toshifumi Kakutani, Abiko (JP); Yousuke Hata, Ichikawa (JP); Shinya Suzuki, Toride (JP); Hirohisa Nakajima, Tsukubamirai (JP); Takeyuki Suda, Nagareyama (JP); Toshiyuki Abe, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/880,027

(22) Filed: Oct. 9, 2015

(65) Prior Publication Data

US 2016/0101955 A1 Apr. 14, 2016

(30) Foreign Application Priority Data

Oct. 14, 2014 (JP) .................................. 2014-210285
Sep. 30, 2015 (JP) .................................. 2015-193494

(51) Int. Cl.
*B65H 7/02* (2006.01)
*B65H 7/04* (2006.01)
(Continued)

(52) U.S. Cl.
CPC ................. *B65H 7/04* (2013.01); *B65H 7/14* (2013.01); *H04N 1/00477* (2013.01);
(Continued)

(58) Field of Classification Search
CPC ....... B65H 7/04; B65H 7/14; B65H 2511/152
See application file for complete search history.

(56) References Cited

U.S. PATENT DOCUMENTS

| 7,374,163 | B2 * | 5/2008 | Cook | ........................ | B65H 1/00 271/145 |
| 7,523,930 | B2 * | 4/2009 | Kang | ........................ | B65H 1/20 271/126 |

(Continued)

FOREIGN PATENT DOCUMENTS

JP 10-007291 A 1/1998
JP 2014-005122 A 1/2014

*Primary Examiner* — Howard Sanders
(74) *Attorney, Agent, or Firm* — Canon U.S.A., Inc. IP Division

(57) ABSTRACT

A sheet feeding apparatus includes a stacking member, an optical sensor, a detected member, and a control unit. As an amount of sheets stacked on the stacking member decreases, the detected member moves from a first position in which optical sensor light is not interrupted, then once interrupts the light, and then moves to a second position in which the light is not interrupted. Information regarding an amount of sheets transmitted by the control unit, when stored information is about the detected member in the second position, is information notifying that an amount of sheets stacked on the stacking member is less than that of information regarding an amount of sheets stacked on the stacking member transmitted by the control unit when stored information is about the detected member is in the first position.

23 Claims, 14 Drawing Sheets

(51) Int. Cl.
*H04N 1/00* (2006.01)
*B65H 7/14* (2006.01)
(52) U.S. Cl.
CPC ..... *H04N 1/00567* (2013.01); *B65H 2220/09* (2013.01); *B65H 2511/152* (2013.01)

(56) References Cited

U.S. PATENT DOCUMENTS

2010/0322642 A1* 12/2010 Yamauchi ................ B65H 7/20
                                                     399/23
2016/0075529 A1*  3/2016 Nishioka ................ B65H 1/266
                                                     271/162

* cited by examiner

FIG.14

| REMAINING AMOUNT DISPLAY | SHEET REMAINING AMOUNT DETECTION SENSOR A | SHEET REMAINING AMOUNT DETECTION SENSOR B | SHEET PRESENCE/ABSENCE DETECTION SENSOR |
|---|---|---|---|
| ☰ | 0 | 0 | 1 |
| ☰ | 0 | 1 | 1 |
| ⌐ | 1 | 1 | 1 |
| ⌐ | | | 0 |

WHEN SHEET REMAINING AMOUNT DETECTION SENSOR A/SHEET REMAINING AMOUNT DETECTION SENSOR B DETECTS SHEET, VALUE WILL BE 1.

SHEET FEEDING APPARATUS AND IMAGE FORMING APPARATUS

BACKGROUND OF THE INVENTION

Field of the Invention

The present invention relates to a sheet feeding apparatus for feeding a sheet used in an image forming apparatus such as a multifunction peripheral and a printer.

Description of the Related Art

A sheet feeding apparatus used in an image forming apparatus such as a printer generally feeds an uppermost sheet of sheets stacked on a sheet stacking tray one by one. In this regard, a sheet remaining amount in a sheet feeding cassette may be detected in order to notify a user of the sheet remaining amount in the sheet feeding cassette and prompt the user to supply sheets. There are some conventional discussions about detection of a sheet remaining amount. For example, according to Japanese Patent Application Laid-Open No. 10-007291, an encoder is disposed in a rotation unit of a lift motor for a sheet lift operation, and a slit of the encoder is measured by a sensor to detect the number of stacked sheets from pulse numbers (a rotation angle and a moving amount) from the sensor when the lift motor rotates.

According to Japanese Patent Application Laid-Open No. 2014-5122, a mechanism in which a interrupting plate linearly moves in conjunction with a lift of sheets to interrupt a sensor and a plurality of sensors for detecting a position of the interrupting plate are constituted. The number of stacked sheets is detected by the number of the sensors interrupted by the interrupting plate.

However, the technique described in Japanese Patent Application Laid-Open No. 10-007291 requires an encoder and the like because continuous monitoring is necessary to measure a moving amount, and there is an issue that an increase in the number of parts increases a cost. The technique described in Japanese Patent Application Laid-Open No. 2014-5122 can downsize a configuration around the sensor, however gears and pulleys are necessary to be included in an entire apparatus. In addition, a flag for interrupting light in the sensor needs to be designed in a large size to interrupt a plurality of sensors so as not to cause a sensor transition state, which makes an apparatus size complicated and large.

SUMMARY OF THE INVENTION

The present invention is directed to solve the above-described issues. A sheet feeding apparatus according to an aspect of the present invention includes a stacking member on which a sheet is stacked, wherein the stacking member moves according to an amount of sheets stacked thereon, a first optical sensor including a light-emitting unit and a light-receiving unit, a detected member which can interrupt light in a light path of the first optical sensor, wherein the detected member moves from a first position in which light in the light path of the first optical sensor is not interrupted, then once interrupts light in the light path of the first optical sensor, and then moves to a second position in which light in the light path of the first optical sensor is not interrupted in this order as an amount of sheets stacked on the stacking member decreases according to movement of the stacking member, a storage unit configured to store information regarding that the detected member is in the first position or information regarding that the detected member is in the second position, and a control unit configured to transmit information regarding an amount of sheets stacked on the stacking member based on information stored in the storage unit, wherein, information stored in the storage unit is changed based on a detection result of the first optical sensor, and wherein, information regarding an amount of sheets transmitted by the control unit, in a case where information stored in the storage unit is information regarding that the detected member is in the second position, is information notifying that an amount of sheets stacked on the stacking member is less than that of information regarding an amount of sheets stacked on the stacking member transmitted by the control unit in a case where information stored in the storage unit is information regarding that the detected member is in the first position.

In an example, according to a sheet feeding apparatus in which a sheet remaining amount flag is lowered as a stacking tray is lifted, when the sheet remaining amount flag is in a position between a sheet remaining amount detection sensor A and a sheet remaining amount detection sensor B, it is determined that a sheet remaining amount is less than that when the sheet remaining amount flag is in a position above the sheet remaining amount detection sensor A. Further features of the present invention will become apparent from the following description of exemplary embodiments with reference to the attached drawings.

BRIEF DESCRIPTION OF THE DRAWINGS

FIG. 14 is a table of combinations of a detection result of the optical sensor and the remaining amount detection display.

DESCRIPTION OF THE EMBODIMENTS

Figure 1:
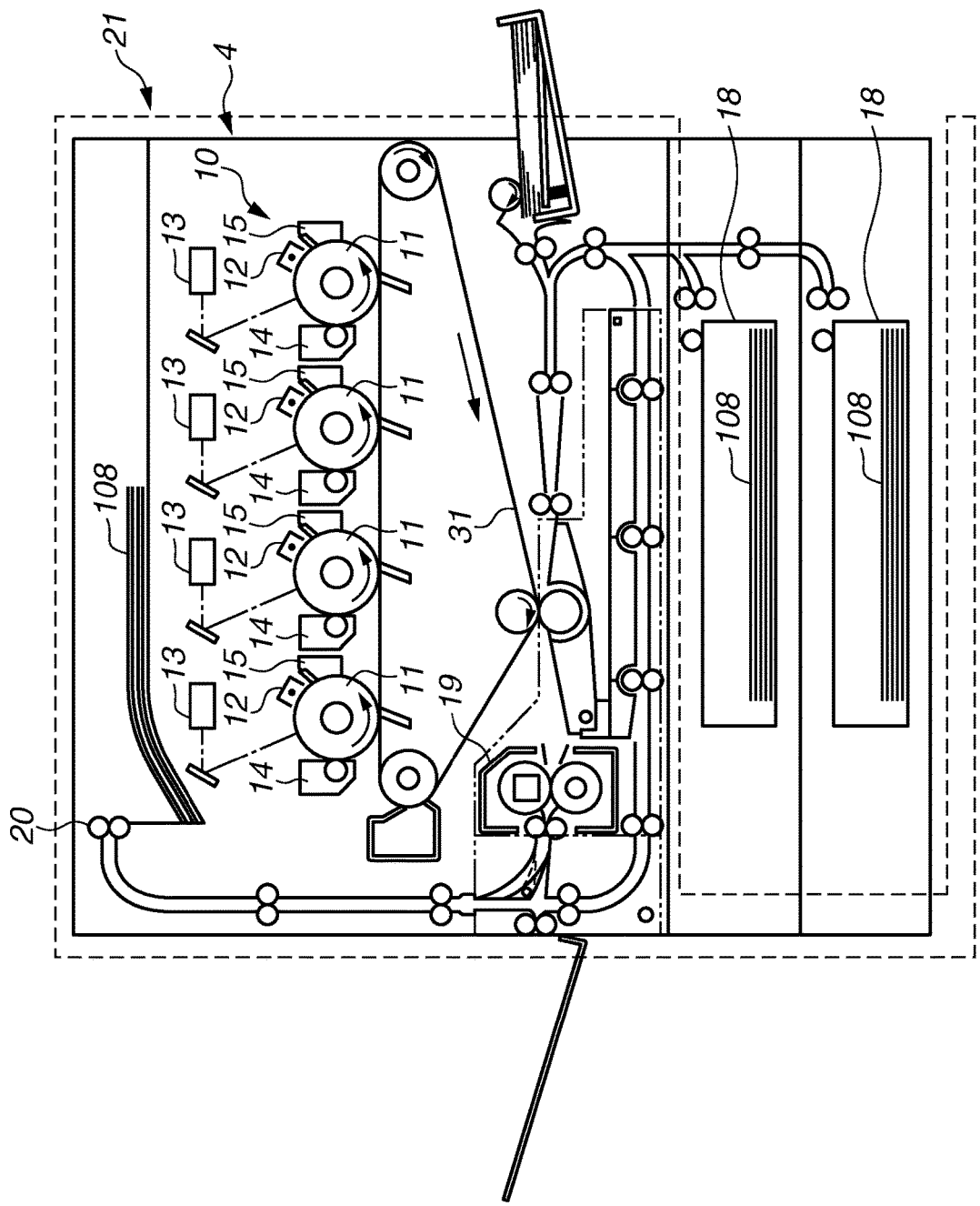
FIG. 1 is a cross section diagram illustrating a configuration of an image forming apparatus.

FIG. 1 is a schematic cross section diagram of an image forming apparatus 1.

As illustrated in FIG. 1, the image forming apparatus 1 includes an image forming unit 4. The image forming unit 4 includes photosensitive drums 11, corona charging devices 12, development units 14, an intermediate transfer belt 31, cleaners 15, and the like. A laser unit 13 irradiates an optical image on the photosensitive drum 11 based on image data, and an electrostatic latent image is formed on a surface of the photosensitive drum 11. The corona charging device 12 uniformly charges the surface of the photosensitive drum 11 before the laser light is irradiated. The development units 14 are arranged in a movement direction of the intermediate transfer belt 31 in an order of yellow (Y), magenta (M), cyan (C), and black (K). A toner of each color is applied to an electrostatic latent image formed on the surface of the photosensitive drum 11, and a toner image is formed. The toner image developed on the surface of the photosensitive drum 11 is transferred to the intermediate transfer belt 31, and the toner image on the intermediate transfer belt 31 is transferred to a sheet 108. The cleaner 15 removes a residual toner on the photosensitive drum 11 after the toner image is transferred.

The sheet 108 stacked on a sheet feeding cassette (a containing member) 18 is conveyed through a conveyance path, and the toner image on the intermediate transfer belt 31 is transferred thereto. A fixing device 19 is disposed in a downstream side of the image forming unit 4 and fixes the toner image on the conveyed sheet 108. The sheet 108 to which the toner image is fixed by the fixing device 19 is discharged from the image forming apparatus 1 by a pair of discharge rollers 20.

Figure 2:
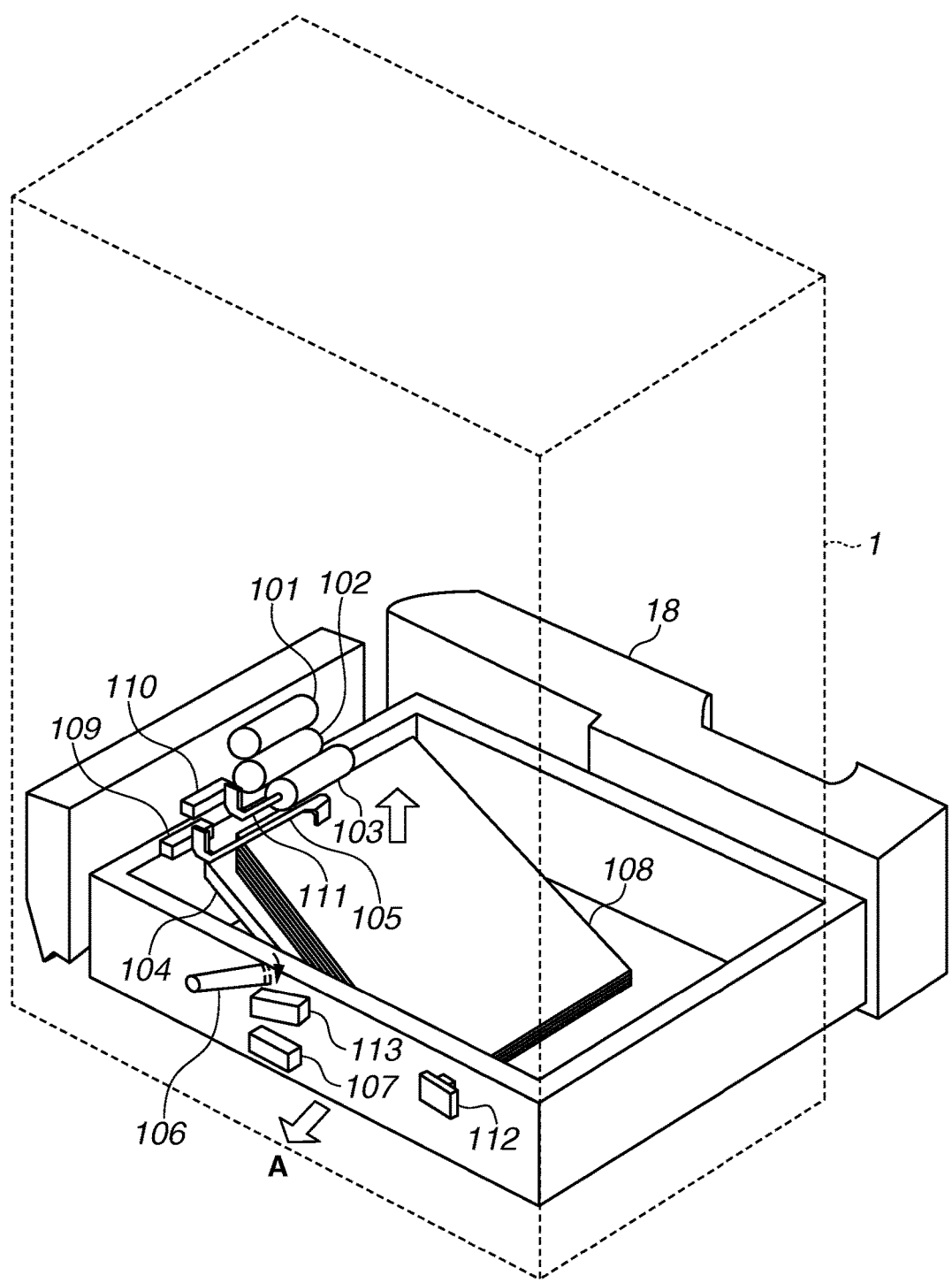
FIG. 2 is a cross section diagram illustrating a configuration of a sheet feeding apparatus.

FIG. 2 is an outline view of the sheet feeding cassette 18.

The sheet feeding cassette 18 is disposed in an apparatus main body 21 of the image forming apparatus 1 in a drawable manner. The drawn sheet feeding cassette 18 is inserted to a direction indicated by an arrow A. The apparatus main body 21 refers to a part excluding the sheet feeding cassette 18 from the image forming apparatus 1. Inserting and drawing of the sheet feeding cassette 18 is detected by a cassette presence/absence detection sensor 112 attached to the apparatus main body 21. The cassette presence/absence detection sensor 112 is also used as a sheet size detection sensor.

A pickup roller 103 disposed in the apparatus main body 21 is a mechanism for feeding an uppermost sheet of sheets contained in the sheet feeding cassette 18 and is connected to a motor, not illustrated, disposed in the apparatus main body 21 via a drive coupling unit, not illustrated. A stacking tray 104 is a tray for stacking sheets as a stacking member on which sheets are stacked. The stacking tray 104 is disposed in the sheet feeding cassette 18 in a liftable manner. When the sheet feeding cassette 18 is inserted into the apparatus main body 21, the stacking tray 104 starts to lift. The stacking tray 104 is connected to a lifter motor 203 (see FIG. 10) serving as a lift unit for lifting the stacking tray 104. When a user draws out the sheet feeding cassette 18 from the apparatus main body 21 in a state in which the stacking tray 104 is lifted, the coupling of the drive coupling unit, not illustrated, is released, and the stacking tray 104 is lowered. In other words, when the sheet feeding cassette is drawn out from the apparatus main body 21, the stacking tray 104 is lowered. In addition, when the sheet feeding cassette 18 is drawn out from the image forming apparatus 1, the stacking tray 104 is lowered by its own weight, and a lowering speed is reduced by a damper, not illustrated.

According to the present exemplary embodiment, a sheet surface detection sensor 110, a sheet surface detection flag 111, and the pickup roller 103 constitute a sheet surface detection unit for detecting a stacking amount of sheets stacked on the stacking tray 104. The sheet surface detection unit detects a stacking amount of sheets stacked on the stacking tray 104 by coming into contact with the sheet 108 stacked on the stacking tray 104 or the stacking tray 104.

The sheet surface detection flag 111 is configured to interlock with the pickup roller 103, and when the pickup roller 103 is pressed by the sheet 108 or the stacking tray 104, the sheet surface detection flag 111 is also pressed at the same time.

The sheet surface detection sensor 110 is a transmission type photo-interrupter. Lifting of the stacking tray 104 causes the sheet 108 to lift the pickup roller 103, and when the sheet 108 or the stacking tray 104 exceeds a sheet surface detection line (a detection height), the sheet surface detection flag 111 interrupts light in the sheet surface detection sensor 110. The sheet surface detection sensor 110 is configured to detect that a sheet surface is lifted to a sheet feedable height by the above-described fact, and the stacking tray 104 is lifted to be detected by the sheet surface detection sensor 110. Therefore, a lifting amount of the stacking tray 104 varies in response to an amount of sheets stacked on the stacking tray 104.

A sheet remaining amount flag 106, a sheet remaining amount detection sensor A (a first optical sensor) 113, a sheet remaining amount detection sensor B (a second optical sensor) 107, and a central processing unit (CPU) 200 as a control unit (FIG. 10) are mechanism for detecting a remaining amount of the sheets 108 stacked on the stacking tray 104. The CPU 200 transmits information regarding an amount of the sheets 108 stacked on the stacking tray 104 based on detection results of the sheet remaining amount detection sensor A 113 and the sheet remaining amount detection sensor B 107 and changes information to be displayed on a display unit 205, which is described below.

The sheet remaining amount detection sensor A 113 and the sheet remaining amount detection sensor B 107 are transmission type photo-interrupters and each includes a light-emitting unit α and a light-receiving unit β.

The sheet remaining amount flag 106 as a detected member is configured to interlock with the stacking tray 104, and a moving distance varies in response to a distance that the stacking tray 104 is lifted. The sheet remaining amount flag 106 interrupts a light path between the light-emitting unit α and the light-receiving unit β of the sheet remaining amount detection sensor A 113 (or the sheet remaining amount detection sensor B 107) in response to the stacking number of the sheets 108, so that the remaining amount of the sheets 108 is detected. Feeding rollers 101 and 102 feed out the sheet 108 fed by the pickup roller 103 to the image forming unit 4.

Operations of the sheet feeding cassette 18 are described with reference to FIG. 2.

The sheets 108 are stacked on the stacking tray 104, and the sheet feeding cassette 18 is set to the apparatus main body 21. At that time, the cassette presence/absence detection sensor 112 detects presence or absence of the sheet feeding cassette 18. When a motor (the lifter motor 203 described below) connected as a drive source operates, the stacking tray 104 starts lifting (hereinbelow, a lift up operation). When a sheet is stacked on the lifted stacking tray 104, the sheet presses the sheet presence/absence detection flag 105, and the sheet presence/absence detection flag 105 interrupts light in a sheet presence/absence detection sensor 109. When light is interrupted, it is determined that the sheet 108 is present. After the sheet presence/absence detection flag 105 is pressed, the stacking tray 104 is further lifted, and the pickup roller 103 is pressed by the sheet 108. In addition, the sheet surface detection flag 111 interrupts light in the sheet surface detection sensor 110 in conjunction with the pickup roller 103. When the light in the sheet surface detection sensor 110 interrupted, the CPU 200 determines that a sheet surface of the sheet 108 is in a feedable position.

Figure 12:
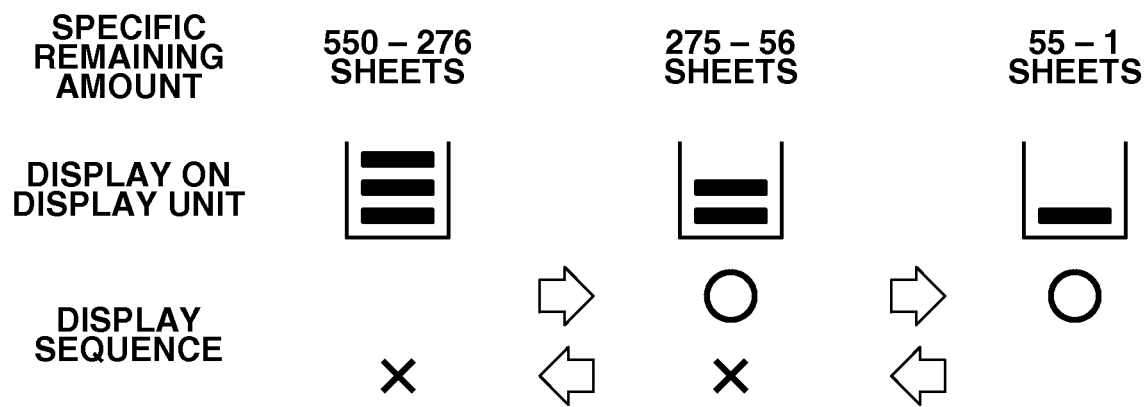
FIG. 12 is a sequence illustrating display of sheet remaining amount detection.

A moving amount of the sheet remaining amount flag 106 varies in response to the moving distance of the stacking tray 104 moves by the lift up operation. According to a difference in the moving amount, a combination of light interruption states of the sheet remaining amount detection sensor A 113 and the sheet remaining amount detection sensor B 107 varies, and a sheet remaining amount can be expressed in three states as illustrated in FIG. 12. In addition, sheet absence can be detected based on a detection result of the sheet presence/absence detection sensor 109. The sheet remaining amount is displayed in four states in total including the above-described three states of sheet presence and one state of sheet absence on the display unit 205 disposed on the apparatus main body 21. If a personal computer (PC) is connected to the image forming apparatus 1, the sheet remaining amount can be displayed in the four states on the PC.

A positional relationship among the sheet remaining amount flag 106, the sheet remaining amount detection sensor A 113, and the sheet remaining amount detection sensor B 107 is described with reference to FIGS. 8 and 9A to 9C.

The stacking tray 104 is lifted higher as the stacked sheets 108 become fewer, and the sheet remaining amount flag 106 is configured to descend in conjunction with lifting of the stacking tray 104.

Figure 9A:
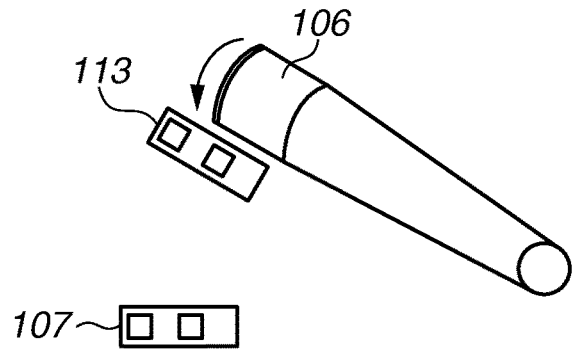
FIGS. 9A to 9C illustrate features of positions of the optical sensor and positions of the flag.

When the stacking number of the sheets 108 is in between 550 sheets (a maximum stacking sheet number) and 276 sheets, the sheet remaining amount flag 106 is in a position above the sheet remaining amount detection sensor A 113 (a first position: FIG. 9A). At that time, the sheet remaining amount flag 106 interrupts light in neither the sheet remaining amount detection sensor A 113 nor the sheet remaining amount detection sensor B 107.

Figure 9B:
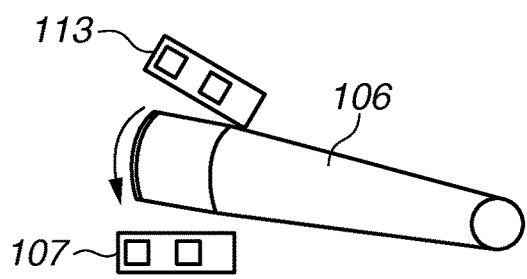

When the sheet remaining amount is in between 275 sheets and 56 sheets, the sheet remaining amount flag 106 once interrupts light in the sheet remaining amount detection sensor A 113 and is in a position between the sheet remaining amount detection sensor A 113 and the sheet remaining amount detection sensor B 107 (a second position: FIG. 9B).

Figure 9C:
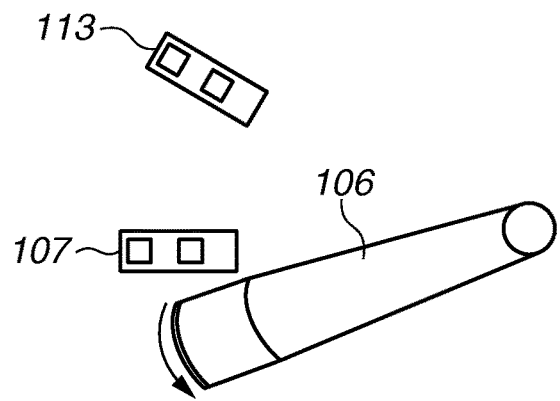

When the sheet remaining amount is in between 55 sheets to 1 sheet, namely a minimum stacking sheet number, the sheet remaining amount flag 106 once interrupts light in the sheet remaining amount detection sensor B 107 and is in a position below the sheet remaining amount detection sensor B 107 (a third position: FIG. 9C).

Conventionally, the sheet remaining amount flag 106 is formed in a size capable of simultaneously interrupting light in the sheet remaining amount detection sensor A 113 and in the sheet remaining amount detection sensor B 107.

In the conventional configuration, a position of the sheet remaining amount flag 106 is determined according to determination of following three situations.

Light in the sheet remaining amount detection sensor A 113 is interrupted. Light in the sheet remaining amount detection sensor B 107 is not interrupted.

Light in the sheet remaining amount detection sensor A 113 is interrupted. Light in the sheet remaining amount detection sensor B 107 is also interrupted.

Light in the sheet remaining amount detection sensor A 113 is not interrupted. Light in the sheet remaining amount detection sensor B 107 is interrupted.

However, if the sheet remaining amount flag 106 is downsized for downsizing the apparatus, the sheet remaining amount flag 106 will lose the ability to simultaneously interrupt a light path of the sheet remaining amount detection sensor A 113 and a light path of the sheet remaining amount detection sensor B 107. Therefore, if the sheet remaining amount flag 106 is in the first position, the second position, or the third position, neither light in the sheet remaining amount detection sensor A 113 nor light in the sheet remaining amount detection sensor B 107 is interrupted, and an issue occurs that the position of the sheet remaining amount flag 106 is uncertain.

Figure 5:
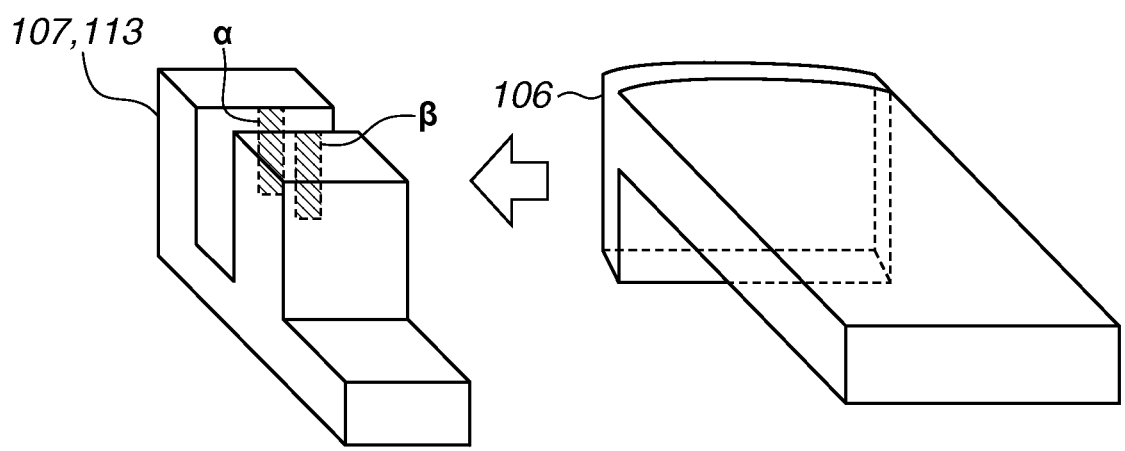
FIG. 5 illustrates an optical sensor and a flag.
Figure 6:
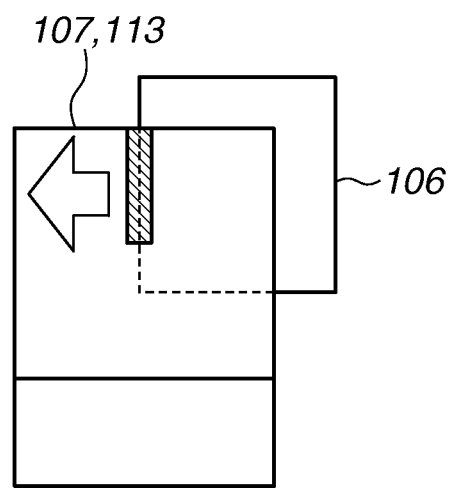
FIG. 6 illustrates an optical sensor and a flag when the flag interrupts light in the optical sensor.
Figure 7:
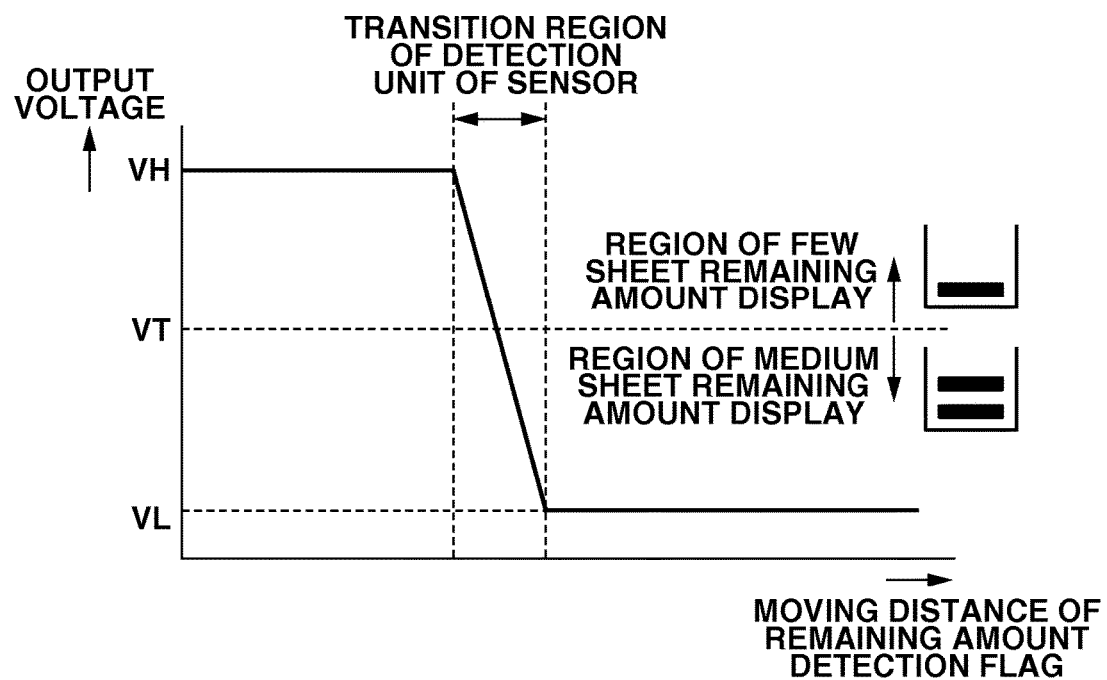
FIG. 7 illustrates a relationship between output of an optical sensor and a moving distance of a flag.
Figure 8:
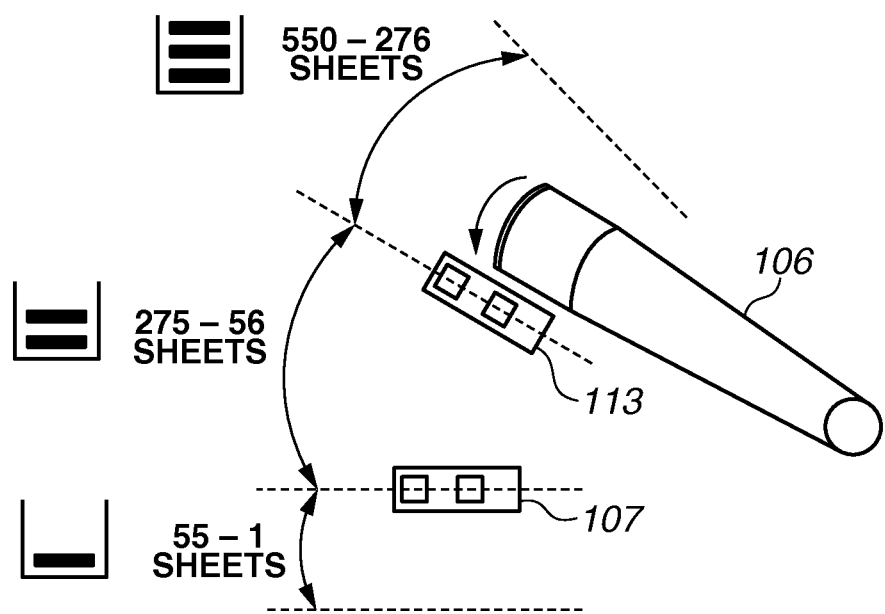
FIG. 8 illustrates a correlation of a position of the optical sensor, a position of the flag, and a sheet remaining amount display.

As another issue, a point that remaining amount determination by a remaining amount detection sensor is not stable is described with reference to FIGS. 5 and 6. As illustrated in FIGS. 5 and 6, the sheet remaining amount flag 106 slidingly moves through a detection unit of the sheet remaining amount detection sensor A 113 (the sheet remaining amount detection sensor B 107). At that time, an output voltage indicates motion as illustrated in FIG. 7 according to the moving distance of the sheet remaining amount flag 106. An output voltage VH indicates a state in which the light path of the sheet remaining amount detection sensor A 113 (the sheet remaining amount detection sensor B 107) is interrupted, and an output voltage VL indicates a state in which light passes through without being interrupted. A threshold voltage VT is a threshold value for detecting a remaining amount, and, for example, if an output voltage of the sheet remaining amount detection sensor B 107 is equal to or greater than the threshold voltage VT, the minimum stacking sheet number is displayed, whereas if it is less than the threshold voltage VT, a second largest stacking sheet number is displayed. A region in which the output voltage is shifted from VL to VH is referred to as a transition region, and the output voltage in this region is often unstable. For example, when the sheet remaining amount flag 106 stops in the transition region of the sheet remaining amount detection sensor A 113 (the sheet remaining amount detection sensor B 107) (when the sheet remaining amount flag 106 is in a position as illustrated in FIG. 6), there is an issue that determination of the sheet remaining amount is not stable.

A configuration and operations of a control system according to the present exemplary embodiment which solves the above-described issues in the conventional configuration are described below with reference to the drawings.

Figure 10:
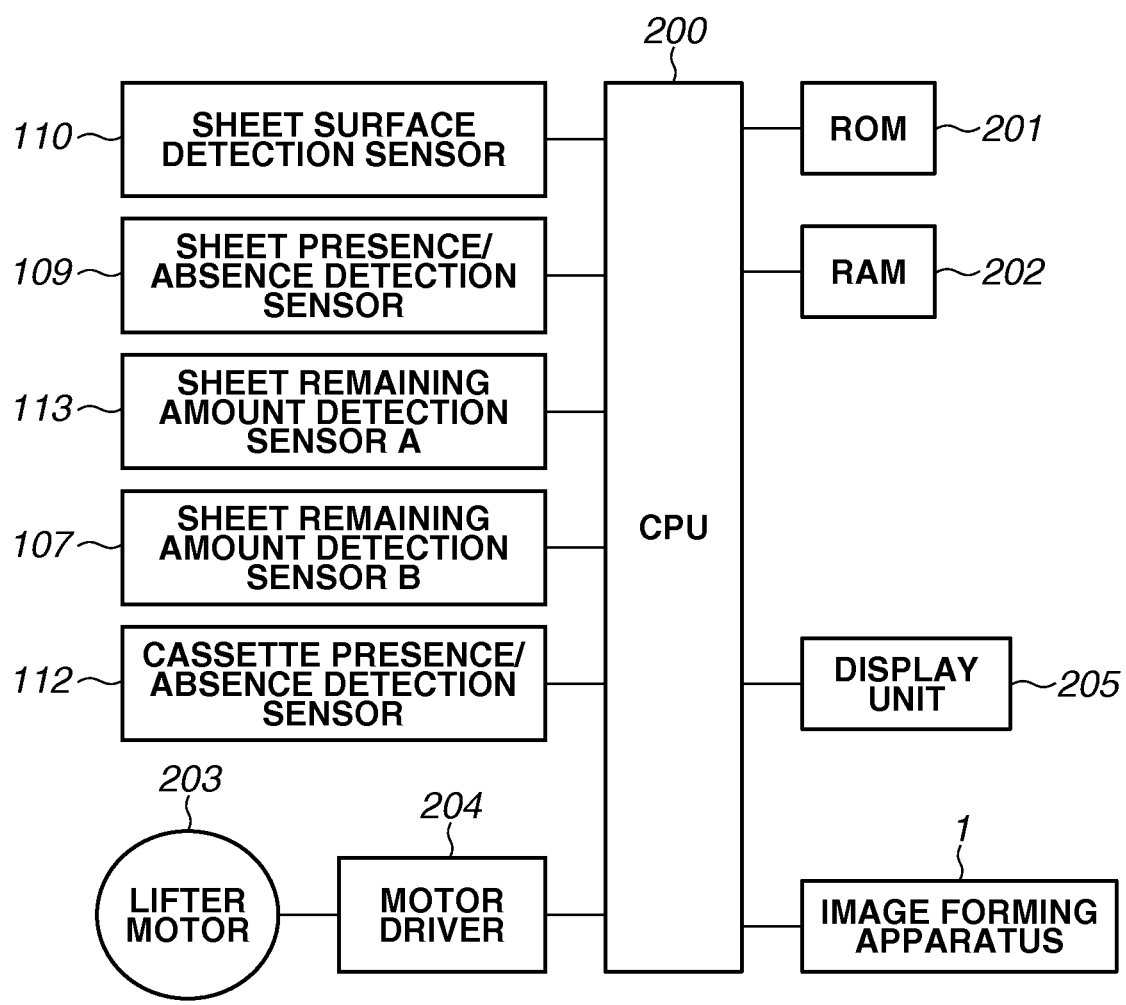
FIG. 10 is a block diagram of a control circuit of the image forming apparatus.

FIG. 10 is a block diagram of a sheet conveyance control circuit of the image forming apparatus 1.

The CPU 200 is a control unit for performing sheet conveyance. A random access memory (RAM) 202 (a storage unit) is a volatile memory, such as a dynamic random access memory (DRAM) which stores a sheet remaining amount at the time of lifting up when the cassette is inserted. A read only memory (ROM) 201 is a storage unit which is a nonvolatile memory, such as an electrically erasable and programmable read only memory (EEPROM), capable of retaining information if an apparatus power source is shut down. The ROM 201 stores a sheet remaining amount table regarding the sheet remaining amount. The CPU 200 drives the lifter motor 203 to lift the stacking tray 104 by controlling a motor driver 204 by a pulse-width modulation (PWM) control signal and the like. The CPU 200 checks the light interruption states of the sheet remaining amount detection sensor A 113 and the sheet remaining amount detection sensor B 107 to determine the sheet remaining amount. The CPU 200 can further determine the sheet remaining amount by comparing and referring to the states of the sheet remaining amount detection sensor A 113 and the sheet remaining amount detection sensor B 107 and data in the sheet remaining amount table.

When the sheet feeding cassette 18 is drawn out from the apparatus main body 21, the stacking tray 104 is lowered, and the sheet remaining amount flag 106 is lifted. In a state in which the sheet feeding cassette 18 is drawn out from the apparatus main body 21, the stacking tray 104 is in a lowest position, and the sheet remaining amount flag 106 is in a highest position (FIG. 9A). If the sheet feeding cassette 18 is inserted into the apparatus main body 21 again, the stacking tray 104 is lifted up.

Upon detecting a sheet surface when the above-described stacking tray 104 is lifted, the sheet surface detection sensor 110 transmits a detection signal to the CPU 200. The CPU 200 determines a sheet surface position based on the detection signal of the sheet surface detection sensor 110. Upon detecting a sheet, the sheet presence/absence detection sensor 109 for determining presence or absence of a sheet transmits a sheet detection signal to the CPU 200. The CPU 200 determines presence or absence of a sheet based on the detection signals from the sheet presence/absence detection sensor 109 and the sheet surface detection sensor 110.

Figure 3:
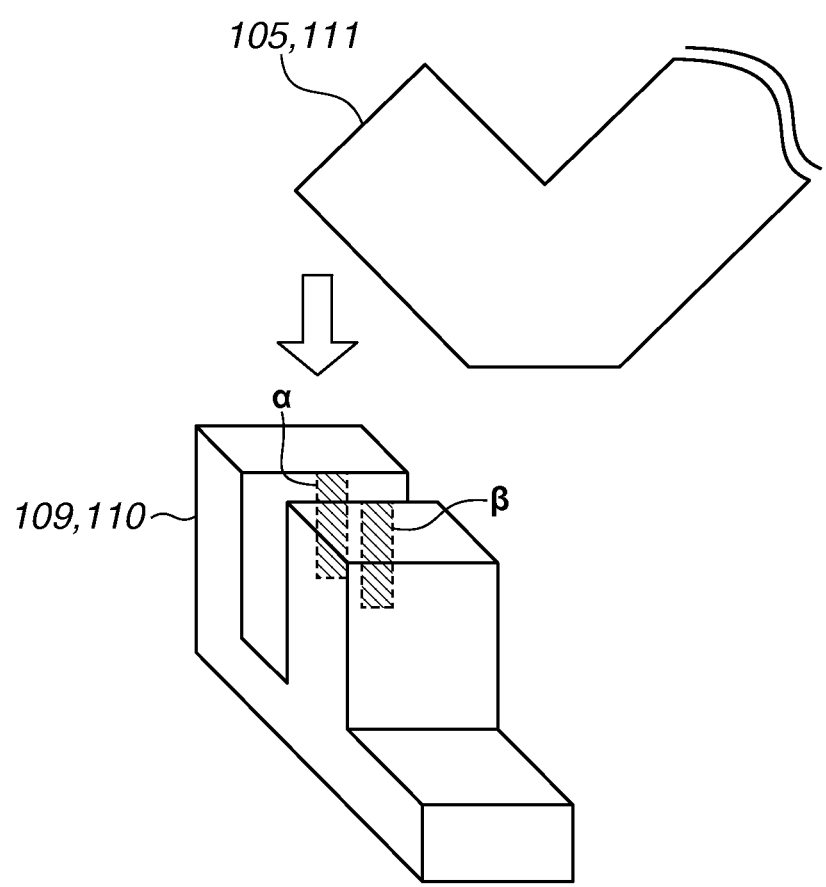
FIG. 3 illustrates an optical sensor and a flag.
Figure 4:
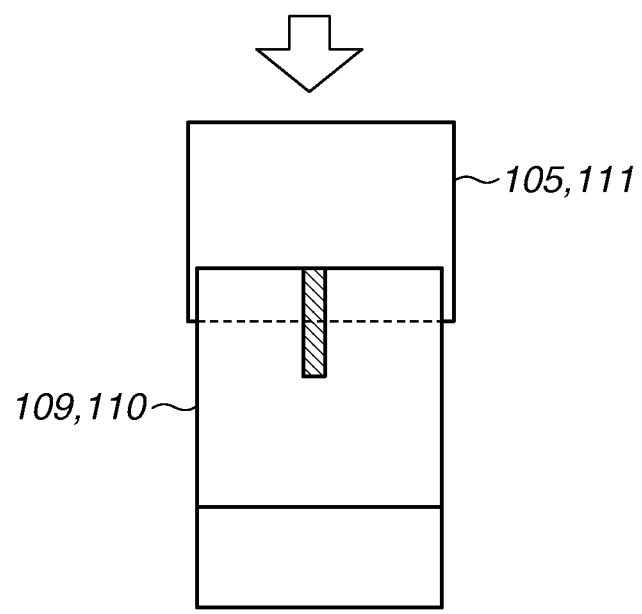
FIG. 4 illustrates an optical sensor and a flag when the flag interrupts light in the optical sensor.

The sheet remaining amount detection sensor A 113 and the sheet remaining amount detection sensor B 107 for detecting a sheet remaining amount each transmits a detection signal to the CPU 200 when a light path thereof is interrupted by the sheet remaining amount flag 106. When the sheet remaining amount detection sensor A 113 and the sheet remaining amount detection sensor B 107 detect interruption of light, the CPU 200 stores detection information pieces of the sheet remaining amount detection sensor A 113 and the sheet remaining amount detection sensor B 107 in the RAM 202. The CPU 200 determines the sheet remaining amount from information stored in the RAM 202 and changes information regarding the sheet remaining amount displayed by the display unit 205. A user can find a sheet remaining amount from the display of the display unit 205. The sheet surface detection sensor 110, the sheet presence/absence detection sensor 109, and the cassette presence/absence detection sensor may be constituted by a mechanical switch and the like in addition to an optical sensor. An outline view of the optical sensor is illustrated in FIGS. 3 and 5. The optical sensor includes a mechanism to detect interruption when an interruption plate or the like interrupts a light path as illustrated in FIGS. 4 and 6.

A remaining amount detection flow is described with a focus on the lift up operation. Detection sequences described below are performed when the image forming apparatus 1 is started up or restored from a state in which a power saving function is operated, and when the stacking tray 104 is lifted due to insertion of the sheet feeding cassette 18 or a sheet feeding operation for image formation.

Figure 11:
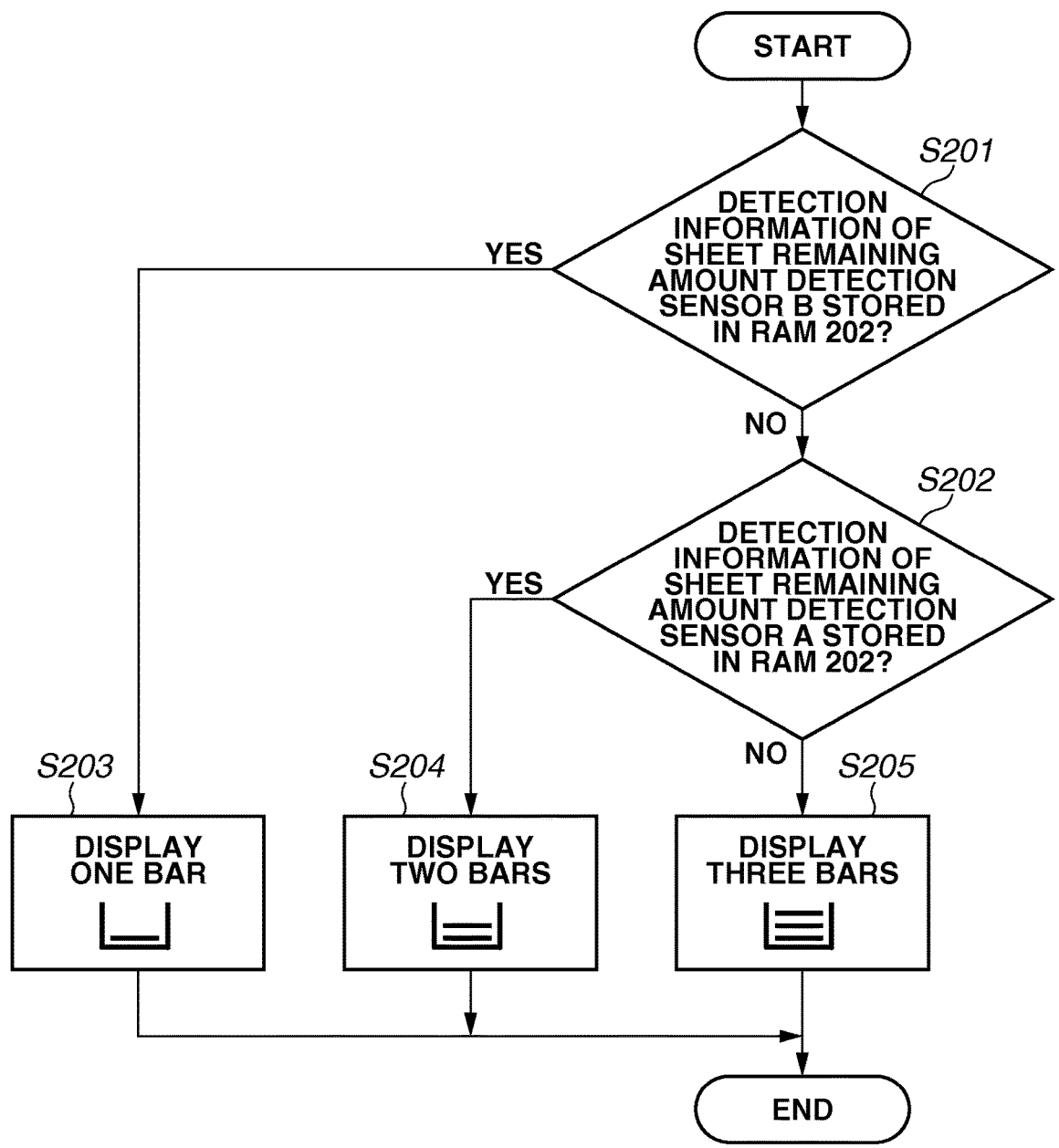
FIG. 11 is a flowchart illustrating sheet remaining amount detection.
Figure 13:
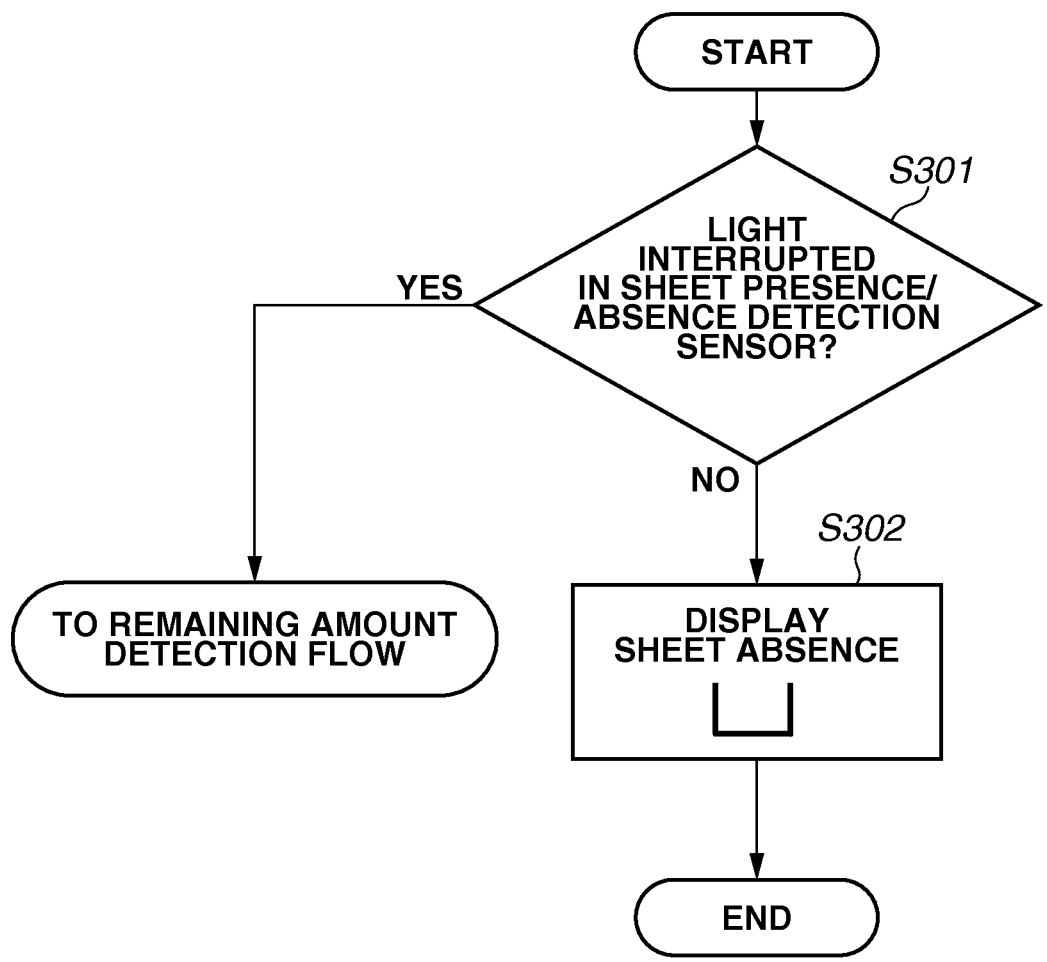
FIG. 13 is a flowchart illustrating remaining amount detection display when no sheet remains.

FIG. 11 is a flowchart illustrating sheet remaining amount detection. FIG. 13 is a flowchart illustrating detection of presence or absence of a sheet.

When the sheet feeding cassette 18 is inserted into the apparatus main body 21, the CPU 200 determines whether the sheet surface detection sensor 110 detects a sheet surface.

If a sheet surface is not detected, the CPU 200 controls the lifter motor 203 to start the lift up operation of the stacking tray 104.

The lift up operation of the stacking tray 104 is performed in following cases. For example, a case in which the sheet feeding cassette 18 is drawn out from the apparatus main body 21, and the stacking tray 104 is lowered, then the sheet feeding cassette 18 is loaded again to the apparatus main body 21 and a case in which the sheet 108 stacked on the stacking tray is fed in the image formation and the sheet surface is not detected.

In such cases, the CPU 200 controls the lifter motor 203 to lift the stacking tray 104 until the sheet surface detection sensor 110 detects a sheet surface.

A sheet presence/absence detection sequence performed by the CPU 200 is described with reference to FIG. 13.

In step S301, if the sheet presence/absence detection sensor 109 does not detect interruption of light in a state that the sheet surface detection sensor 110 detects interruption of light (NO in step S301), the CPU 200 determines that the sheet 108 is not stacked on the sheet feeding cassette 18. Then, in step S302, the CPU 200 displays information regarding the sheet absence on the display unit 205 to notify a user of the sheet absence. If the sheet presence/absence detection sensor 109 determines that the sheet exists (YES in step S301), the CPU 200 shifts the processing to a remaining amount detection flowchart (FIG. 11) using the sheet remaining amount detection sensor A 113 and the sheet remaining amount detection sensor B 107.

When both of the sheet surface detection sensor 110 and the sheet presence/absence detection sensor 109 detect interruption of light, the CPU 200 determines the sheet remaining amount according to the flowchart in FIG. 11.

The CPU 200 monitors detection states of the sheet remaining amount detection sensor A 113 and the sheet remaining amount detection sensor B 107 at the time of the lift up operation of the stacking tray 104.

When the sheet remaining amount detection sensor A 113 and the sheet remaining amount detection sensor B 107 detect interruption of light, the CPU 200 stores the detection information pieces of the sheet remaining amount detection sensor A 113 and the sheet remaining amount detection sensor B 107 in the RAM 202 as information regarding a sheet amount. The CPU 200 determines the sheet remaining amount from the detection information of each sheet remaining amount detection sensor stored in the RAM 202 and table information in FIG. 14. The detection information of each sheet remaining amount detection sensor stored in the RAM 202 is information regarding a position of the sheet remaining amount flag 106 and information for determining which position (the first position, the second position, or the third position) the sheet remaining amount flag 106 is in.

In step S201, the CPU 200 determines whether the information indicating that the sheet remaining amount detection sensor B 107 detects interruption of light is stored in the RAM 202. If the information indicating that the sheet remaining amount detection sensor B 107 detects interruption of light is stored in the RAM 202 (YES in step S201), then in step S203, the CPU 200 transmits a signal to control the display unit 205 to perform one bar display as a minimum stacked amount display. If the information indicating that the sheet remaining amount detection sensor B 107 detects interruption of light is not stored in the RAM 202 (NO in step S201), the CPU 200 advances the processing to step S202. In step S202, the CPU 200 determines whether the information indicating that the sheet remaining amount detection sensor A 113 detects interruption of light is stored in the RAM 202. If the information indicating that the sheet remaining amount detection sensor A 113 detects interruption of light is stored in the RAM 202 (YES in step S202), then in step S204, the CPU 200 transmits a signal to control the display unit 205 to perform two bar display as a medium stacked amount display. If the information indicating that the sheet remaining amount detection sensor A 113 detects interruption of light is not stored in the RAM 202

(NO in step S202), then in step S205, the CPU 200 transmits a signal to control the display unit 205 to perform three bar display as a maximum stacked amount display. The one bar, two bar, and three bar display on the display unit 205 are items displaying a predetermined amount of sheets in a bar so as to be visually understandable as illustrated in FIG. 11, and the larger number of bars means the larger stacked amount.

The detection information of each sheet remaining amount detection sensor stored in the RAM 202 is reset when the sheet feeding cassette 18 is drawn out from the apparatus main body 21. A remaining amount detection sequence is executed when the stacking tray 104 is lifted again after the sheet feeding cassette 18 is drawn out from the apparatus main body 21 and the stacking tray 104 is lowered.

The detection information of each sheet remaining amount detection sensor stored in the RAM 202 may not be reset if a time length that the sheet feeding cassette 18 has been drawn out from the apparatus main body 21 is less than a predetermined time length and may be reset if the time length is equal to or longer than the predetermined time length. The CPU 200 measures a time length from when the sheet feeding cassette 18 is drawn out from the apparatus main body 21 to when the cassette presence/absence detection sensor 112 detects that the sheet feeding cassette 18 is inserted again into the image forming apparatus 1 and determines whether to perform the remaining amount detection sequence based on the measured time length. For example, if the time length is equal to or longer than the predetermined time length, the CPU 200 resets the sheet remaining amount value stored in the RAM 202 and determines the sheet remaining amount by checking a state of the sheet remaining amount detection sensor at the time of the lift up operation. Whereas if the time length is less than the predetermined time length, the CPU 200 refers to the previous sheet remaining amount value stored in the RAM 202. This is because if a time length that the sheet feeding cassette 18 has been drawn out is short, the stacking tray 104 is not fully lowered, so that if the remaining amount detection sequence is executed then, there is a possibility that an erroneous determination is made. Especially, in a configuration in which a damper is used as a buffer to reduce a lowering speed when the stacking tray 104 is lowered by its own weight, it is necessary to set a sufficient time length for the stacking tray 104 to completely be lowered.

When the sheet surface detection sensor 110 detects a sheet surface, the CPU 200 does not perform the lift up operation of the stacking tray 104 and displays the sheet remaining amount value on the display unit 205 based on the information regarding the sheet remaining amount stored in the RAM 202.

As described above, information stored in the RAM 202 is changed based on detection results of the sheet remaining amount detection sensors 107 and 113. In addition, the information regarding whether the sheet remaining amount detection sensors 107 and 113 detect interruption of light is stored in the RAM 202, so that it can be determined which of the first position, the second position, or the third position (FIGS. 9A to 9C) the sheet remaining amount flag 106 is in. When the sheet remaining amount flag 106 is determined to be in the second position based on the information stored in the RAM 202, the CPU 200 outputs a signal notifying that the sheet remaining amount is less than that of when the sheet remaining amount flag 106 is determined to be in the first position. Further, when the sheet remaining amount flag 106 is determined to be in the third position based on the information stored in the RAM 202, the CPU 200 outputs a signal notifying that the sheet remaining amount is less than that of when the sheet remaining amount flag 106 is determined to be in the second position. The display unit 205 displays the information regarding the sheet remaining amount based on these signals. As described above, when the sheet remaining amount flag 106 is in a position as illustrated in FIG. 6, the output voltage is unsteady in the transition region as illustrated in FIG. 7, so that the sheet remaining amount display may also be unsteady. However, according to the present exemplary embodiment, the information stored in the RAM 202 is changed when the output voltage once exceeds the threshold voltage VT and is not changed if the output voltage is unsteady later, therefore the sheet remaining amount display does not be unsteady. In other words, the sheet remaining amount display is shifted from the three bar display representing the maximum stacking sheet number to the two bar display representing the medium stacking sheet number, and from the two bar display representing the medium stacking sheet number to the one bar display representing the minimum stacking sheet number as illustrated in FIG. 12. However, the sheet remaining amount display is not shifted from the one bar display representing the minimum stacking sheet number to the two bar display representing the medium stacking sheet number, and from the two bar display representing the medium stacking sheet number to the three bar display representing the maximum stacking sheet number in an opposite manner. Therefore, an issue that the sheet remaining amount display is unsteady will not occur.

According to the present exemplary embodiment, the configuration including two sheet remaining amount detection sensors is described, however, the present invention is not limited to the above-described configuration. For example, the present invention can be applied to a configuration including one sheet remaining amount detection sensor. In other words, the present invention can be applied to a case in which the sheet remaining amount flag moves from a position at which a light path of the sheet remaining amount detection sensor is not interrupted (the first position), once interrupts the light path of the sheet remaining amount detection sensor, and further moves to a position at which the light path of the sheet remaining amount detection sensor is not interrupted (the second position) in response to an amount of sheets.

OTHER EMBODIMENTS

According to the above-described first exemplary embodiment, it is described as an example that the image forming apparatus 1 includes the sheet feeding cassette 18 and the apparatus main body 21 which are integrated with each other, however, the present invention is not limited to this configuration. For example, an apparatus including an image forming unit and a sheet feeding apparatus may be configured as separate entities.

Further, according to the first exemplary embodiment, the sheet feeding apparatus provided to an electrophotographic method image forming apparatus 1 is described as an example, however, the sheet feeding apparatus according to the present exemplary embodiment may be applied to an ink-jet method printer and the like which forms an image on a sheet by ejecting ink thereon.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2014-210285, filed Oct. 14, 2014, and No. 2015-193494, filed Sep. 30, 2015 which are hereby incorporated by reference herein in their entirety.

What is claimed is:

1. A sheet feeding apparatus comprising:
   a stacking member on which a sheet is stacked, wherein the stacking member moves according to an amount of sheets stacked thereon;
   a first optical sensor including a light-emitting unit and a light-receiving unit;
   a detected member which can interrupt light in a light path of the first optical sensor, wherein the detected member moves from a first position in which light in the light path of the first optical sensor is not interrupted, then once interrupts light in the light path of the first optical sensor, and then moves to a second position in which light in the light path of the first optical sensor is not interrupted in this order as an amount of sheets stacked on the stacking member decreases according to movement of the stacking member;
   a storage unit configured to store information regarding that the detected member is in the first position or information regarding that the detected member is in the second position; and
   a control unit configured to transmit information regarding an amount of sheets stacked on the stacking member based on information stored in the storage unit, and to change the information stored in the storage unit based on a detection result of the first optical sensor,
   wherein, in a case where the detected member moves from the first position to the second position, information stored in the storage unit is changed from information regarding that the detected member is in the first position to information regarding that the detected member is in the second position, based on a detection result of the first optical sensor,
   wherein, in a case where the detected member moves from the second position to the first position, information stored in the storage unit is not changed from the information regarding that the detected member is in the second position to the information regarding that the detected member is in the first position, and
   wherein second information is information, regarding an amount of sheets stacked on the stacking member transmitted by the control unit, of a case where information stored in the storage unit is information regarding that the detected member is in the second position, first information is information, regarding an amount of sheets stacked on the stacking member transmitted by the control unit, of a case where information stored in the storage unit is information regarding that the detected member is in the first position, and the second information is information notifying that an amount of sheets stacked on the stacking member is less than an amount of sheets stacked on the stacking member indicated by the first information.

2. The sheet feeding apparatus according to claim 1, wherein, in a case where the first optical sensor detects that light is interrupted by the detected member, information stored in the storage unit is changed from the information regarding that the detected member is in the first position to the information regarding that the detected member is in the second position.

3. The sheet feeding apparatus according to claim 1 further comprising a display unit configured to display information regarding an amount of sheets stacked on the stacking member,
   wherein the display unit changes information displayed on the display unit based on the information regarding an amount of sheets stacked on the stacking member transmitted from the control unit.

4. The sheet feeding apparatus according to claim 1 further comprising a sheet surface detection unit configured to detect a sheet stacked on the stacking member by coming into contact with a sheet stacked on the stacking member or with the stacking member,
   wherein, in a case where the sheet surface detection unit does not come into contact with a sheet or the stacking member, the stacking member is controlled to be lifted.

5. The sheet feeding apparatus according to claim 1 further comprising a containing member disposed in an apparatus main body in a drawable manner and configured to store a sheet,
   wherein the stacking member is disposed in the containing member in a liftable manner.

6. The sheet feeding apparatus according to claim 5, wherein, in a case where the containing member is drawn out from the apparatus main body, the stacking member is lowered.

7. A sheet feeding apparatus comprising:
   a stacking member on which a sheet is stacked, wherein the stacking member moves according to an amount of sheets stacked thereon;
   a first optical sensor including a first light-emitting unit and a first light-receiving unit;
   a second optical sensor including a second light-emitting unit and a second light-receiving unit;
   a detected member which can interrupt light in a light path of the first optical sensor, wherein the detected member moves from a first position in which light in the light path of the first optical sensor is not interrupted, then once interrupts light in the light path of the first optical sensor, then moves to a second position in which light in the light path of the first optical sensor is not interrupted, then once interrupts light in a light path of the second optical sensor, and then moves to a third position in which light in the light path of the second optical sensor is not interrupted in this order as an amount of sheets stacked on the stacking member decreases, wherein the detected member does not interrupt both light paths of the first optical sensor and of the second optical sensor in the second position;
   a storage unit configured to store information regarding that the detected member is in the first position, information regarding that the detected member is in the second position, or information regarding that the detected member is in the third position; and
   a control unit configured to transmit information regarding an amount of sheets stacked on the stacking member based on information stored in the storage unit, and to change the information stored in the storage unit based on a detection result of the first optical sensor and the second optical sensor,
   wherein, second information is information, regarding an amount of sheets stacked on the stacking member transmitted by the control unit, of a case where information stored in the storage unit is information regarding that the detected member is in the second position, first information is information, regarding an amount of sheets stacked on the stacking member transmitted by the control unit, of a case where information stored in the storage unit is information regarding that the detected member is in the first position, and the second information is information notifying that an amount of sheets stacked on the stacking member is less than an amount of sheets stacked on the stacking member indicated by the first information, and wherein third information is information, regarding an amount of sheets stacked on the stacking member transmitted by the control unit, of a case where information stored in the storage unit is information regarding that the detected member is in the third position, and the third information is information notifying that an amount of sheets stacked on the stacking member is less than an amount of sheets stacked on the stacking member indicated by the second information.

8. The sheet feeding apparatus according to claim 7, wherein, in a case where the second optical sensor detects that light is interrupted by the detected member, information stored in the storage unit is changed from the information regarding that the detected member is in the second position to the information regarding that the detected member is in the third position.

9. The sheet feeding apparatus according to claim 7,
wherein, in a case where the detected member moves from the second position to the third position, information stored in the storage unit is changed from the information regarding that the detected member is in the second position to the information regarding that the detected member is in the third position based on a detection result of the second optical sensor, and wherein, in a case where the detected member moves from the third position to the second position, information stored in the storage unit is not changed from the information regarding that the detected member is in the third position to the information regarding that the detected member is in the second position.

10. A sheet feeding apparatus comprising:
a stacking member on which a sheet is stacked, wherein the stacking member moves according to an amount of sheets stacked thereon;
a first optical sensor including a light-emitting unit and a light-receiving unit;
a detected member which can interrupt light in a light path of the first optical sensor, wherein the detected member moves from a first position in which light in the light path of the first optical sensor is not interrupted, then once interrupts light in the light path of the first optical sensor, and then moves to a second position in which light in the light path of the first optical sensor is not interrupted in this order as an amount of sheets stacked on the stacking member decreases according to movement of the stacking member;
a storage unit configured to store information regarding that the detected member is in the first position or information regarding that the detected member is in the second position;
a control unit configured to transmit information regarding an amount of sheets stacked on the stacking member based on information stored in the storage unit, and to change the information stored in the storage unit based on a detection result of the first optical sensor; and
a containing member disposed in an apparatus main body in a drawable manner and configured to store a sheet, wherein the stacking member is disposed in the containing member in a liftable manner, wherein second information is information, regarding an amount of sheets stacked on the stacking member transmitted by the control unit, of a case where information stored in the storage unit is information regarding that the detected member is in the second position, first information is information, regarding an amount of sheets stacked on the stacking member transmitted by the control unit, of a case where information stored in the storage unit is information regarding that the detected member is in the first position, and the second information is information notifying that an amount of sheets stacked on the stacking member is less than an amount of sheets stacked on the stacking member indicated by the first information, and wherein, in a case where the containing member is drawn out from the apparatus main body, information stored in the storage unit is reset.

11. A sheet feeding apparatus comprising:
a stacking member on which a sheet is stacked, wherein the stacking member moves according to an amount of sheets stacked thereon;
a first optical sensor including a light-emitting unit and a light-receiving unit;
a detected member which can interrupt light in a light path of the first optical sensor, wherein the detected member moves from a first position in which light in the light path of the first optical sensor is not interrupted, then once interrupts light in the light path of the first optical sensor, and then moves to a second position in which light in the light path of the first optical sensor is not interrupted in this order as an amount of sheets stacked on the stacking member decreases according to movement of the stacking member;
a storage unit configured to store information regarding that the detected member is in the first position or information regarding that the detected member is in the second position;
a control unit configured to transmit information regarding an amount of sheets stacked on the stacking member based on information stored in the storage unit, and to change the information stored in the storage unit based on a detection result of the first optical sensor; and
a containing member disposed in an apparatus main body in a drawable manner and configured to store a sheet, wherein the stacking member is disposed in the containing member in a liftable manner, wherein second information is information, regarding an amount of sheets stacked on the stacking member transmitted by the control unit, of a case where information stored in the storage unit is information regarding that the detected member is in the second position, first information is information, regarding an amount of sheets stacked on the stacking member transmitted by the control unit, of a case where information stored in the storage unit is information regarding that the detected member is in the first position, and the second information is information notifying that an amount of sheets stacked on the stacking member is less than an amount of sheets stacked on the stacking member indicated by the first information, wherein, in a case where a time length that the containing member has been drawn out from the apparatus main body is less than a predetermined time length, information in the storage unit is retained, and wherein, in a case where a time length that the containing member has been drawn out from the apparatus main body is equal to or longer than the predetermined time length, information in the storage unit is reset.

12. An image forming apparatus comprising:
an image forming unit configured to form an image on a sheet; and
a sheet feeding apparatus configured to feed a sheet to the image forming unit,
wherein the sheet feeding apparatus includes:
a stacking member on which a sheet is stacked, wherein the stacking member moves according to an amount of sheets stacked thereon,
a first optical sensor including a light-emitting unit and a light-receiving unit,
a detected member which can interrupt light in a light path of the first optical sensor, wherein the detected member moves from a first position in which light in the light path of the first optical sensor is not interrupted, then once interrupts light in the light path of the first optical sensor, and then moves to a second position in which light in the light path of the first optical sensor is not interrupted in this order as an amount of sheets stacked on the stacking member decreases according to movement of the stacking member,
a storage unit configured to store information regarding that the detected member is in the first position or information regarding that the detected member is in the second position, and
a control unit configured to transmit information regarding an amount of sheets stacked on the stacking member based on information stored in the storage unit, and to change the information stored in the storage unit based on a detection result of the first optical sensor,
wherein, in a case where the detected member moves from the first position to the second position, information stored in the storage unit is changed from information regarding that the detected member is in the first position to information regarding that the detected member is in the second position, based on a detection result of the first optical sensor,
wherein, in a case where the detected member moves from the second position to the first position, information stored in the storage unit is not changed from the information regarding that the detected member is in the second position to the information regarding that the detected member is in the first position, and
wherein second information is information, regarding an amount of sheets stacked on the stacking member transmitted by the control unit, of a case where information stored in the storage unit is information regarding that the detected member is in the second position, first information is information, regarding an amount of sheets stacked on the stacking member transmitted by the control unit, of a case where information stored in the storage unit is information regarding that the detected member is in the first position, and the second information is information notifying that an amount of sheets stacked on the stacking member is less than an amount of sheets stacked on the stacking member indicated by the first information.

13. The image forming apparatus according to claim 12,
wherein the sheet feeding apparatus further includes a display unit configured to display information regarding an amount of sheets stacked on the stacking member, and
wherein the display unit changes information displayed on the display unit based on the information regarding an amount of sheets stacked on the stacking member transmitted from the control unit.

14. The image forming apparatus according to claim 12,
wherein the sheet feeding apparatus further includes a sheet surface detection unit configured to detect a sheet stacked on the stacking member by coming into contact with a sheet stacked on the stacking member or with the stacking member, and
wherein, in a case where the sheet surface detection unit does not come into contact with a sheet or the stacking member, the stacking member is controlled to be lifted.

15. The image forming apparatus according to claim 12,
wherein the sheet feeding apparatus further includes a containing member disposed in an apparatus main body in a drawable manner and is configured to store a sheet, and
wherein the stacking member is disposed in the containing member in a liftable manner.

16. The image forming apparatus according to claim 15,
wherein, in a case where the containing member is drawn out from the apparatus main body, the stacking member is lowered.

17. The image forming apparatus according to claim 12,
wherein, in a case where the first optical sensor detects that light is interrupted by the detected member, information stored in the storage unit is changed from the information regarding that the detected member is in the first position to the information regarding that the detected member is in the second position.

18. An image forming apparatus comprising:
an image forming unit configured to form an image on a sheet; and
a sheet feeding apparatus configured to feed a sheet to the image forming unit,
wherein the sheet feeding apparatus includes:
a stacking member on which a sheet is stacked, wherein the stacking member moves according to an amount of sheets stacked thereon,
a first optical sensor including a first light-emitting unit and a first light-receiving unit,
a second optical sensor including a second light-emitting unit and a second light-receiving unit,
a detected member which can interrupt light in a light path of the first optical sensor, wherein the detected member moves from a first position in which light in the light path of the first optical sensor is not interrupted, then once interrupts light in the light path of the first optical sensor, then moves to a second position in which light in the light path of the first optical sensor is not interrupted, then once interrupts light in a light path of the second optical sensor, and then moves to a third position in which light in the light path of the second optical sensor is not interrupted in this order as an amount of sheets stacked on the stacking member decreases, wherein the detected member does not interrupt both light paths of the first optical sensor and of the second optical sensor in the second position,
a storage unit configured to store information regarding that the detected member is in the first position, information regarding that the detected member is in the second position, or information regarding that the detected member is in the third position, and a control unit configured to transmit information regarding an amount of sheets stacked on the stacking member based on information stored in the storage unit, and to change the information stored in the storage unit based on a detection result of the first optical sensor and the second optical sensor, wherein second information is information, regarding an amount of sheets stacked on the stacking member transmitted by the control unit, of a case where information stored in the storage unit is information regarding that the detected member is in the second position, first information is information, regarding an amount of sheets stacked on the stacking member transmitted by the control unit, of a case where information stored in the storage unit is information regarding that the detected member is in the first position, and the second information is information notifying that an amount of sheets stacked on the stacking member is less than an amount of sheets stacked on the stacking member indicated by the first information, and wherein third information is information, regarding an amount of sheets stacked on the stacking member transmitted by the control unit, of a case where information stored in the storage unit is information regarding that the detected member is in the third position, and the third information is information notifying that an amount of sheets stacked on the stacking member is less than an amount of sheets stacked on the stacking member indicated by the second information.

19. The image forming apparatus according to claim 18, wherein, in a case where the second optical sensor detects that light is interrupted by the detected member, information stored in the storage unit is changed from the information regarding that the detected member is in the second position to the information regarding that the detected member is in the third position.

20. The image forming apparatus according to claim 18, wherein, in a case where the detected member moves from the second position to the third position, information stored in the storage unit is changed from the information regarding that the detected member is in the second position to the information regarding that the detected member is in the third position based on a detection result of the second optical sensor, and wherein, in a case where the detected member moves from the third position to the second position, information stored in the storage unit is not changed from the information regarding that the detected member is in the third position to the information regarding that the detected member is in the second position.

21. An image forming apparatus comprising:

an image forming unit configured to form an image on a sheet; and a sheet feeding apparatus configured to feed a sheet to the image forming unit, wherein the sheet feeding apparatus includes:

a stacking member on which a sheet is stacked, wherein the stacking member moves according to an amount of sheets stacked thereon, a first optical sensor including a light-emitting unit and a light-receiving unit, a detected member which can interrupt light in a light path of the first optical sensor, wherein the detected member moves from a first position in which light in the light path of the first optical sensor is not interrupted, then once interrupts light in the light path of the first optical sensor, and then moves to a second position in which light in the light path of the first optical sensor is not interrupted in this order as an amount of sheets stacked on the stacking member decreases according to movement of the stacking member, a storage unit configured to store information regarding that the detected member is in the first position or information regarding that the detected member is in the second position, a control unit configured to transmit information regarding an amount of sheets stacked on the stacking member based on information stored in the storage unit, and to change the information stored in the storage unit based on a detection result of the first optical sensor, and a containing member disposed in an apparatus main body in a drawable manner and configured to store a sheet, wherein the stacking member is disposed in the containing member in a liftable manner, wherein second information is information, regarding an amount of sheets stacked on the stacking member transmitted by the control unit, of a case where information stored in the storage unit is information regarding that the detected member is in the second position, first information is information, regarding an amount of sheets stacked on the stacking member transmitted by the control unit, of a case where information stored in the storage unit is information regarding that the detected member is in the first position, and the second information is information notifying that an amount of sheets stacked on the stacking member is less than an amount of sheets stacked on the stacking member indicated by the first information, and wherein, in a case where the containing member is drawn out from the apparatus main body, information stored in the storage unit is reset.

22. An image forming apparatus comprising:

an image forming unit configured to form an image on a sheet; and a sheet feeding apparatus configured to feed a sheet to the image forming unit, wherein the sheet feeding apparatus includes:

a stacking member on which a sheet is stacked, wherein the stacking member moves according to an amount of sheets stacked thereon, a first optical sensor including a light-emitting unit and a light-receiving unit, a detected member which can interrupt light in a light path of the first optical sensor, wherein the detected member moves from a first position in which light in the light path of the first optical sensor is not interrupted, then once interrupts light in the light path of the first optical sensor, and then moves to a second position in which light in the light path of the first optical sensor is not interrupted in this order as an amount of sheets stacked on the stacking member decreases according to movement of the stacking member, a storage unit configured to store information regarding that the detected member is in the first position or information regarding that the detected member is in the second position, a control unit configured to transmit information regarding an amount of sheets stacked on the stacking member based on information stored in the storage unit, and to change the information stored in the storage unit based on a detection result of the first optical sensor, and a containing member disposed in an apparatus main body in a drawable manner and configured to store a sheet, wherein the stacking member is disposed in the containing member in a liftable manner, wherein second information is information, regarding an amount of sheets stacked on the stacking member transmitted by the control unit, of a case where information stored in the storage unit is information regarding that the detected member is in the second position, first information is information, regarding an amount of sheets stacked on the stacking member transmitted by the control unit, of a case where information stored in the storage unit is information regarding that the detected member is in the first position, and the second information is information notifying that an amount of sheets stacked on the stacking member is less than an amount of sheets stacked on the stacking member indicated by the first information, wherein, in a case where a time length that the containing member has been drawn out from the apparatus main body is less than a predetermined time length, information in the storage unit is retained, and wherein, in a case where a time length that the containing member has been drawn out from the apparatus main body is equal to or longer than the predetermined time length, information in the storage unit is reset.

23. A method for a sheet feeding apparatus having a stacking member on which a sheet is stacked, wherein the stacking member moves according to an amount of sheets stacked thereon, a first optical sensor including a light-emitting unit and a light-receiving unit, a detected member which can interrupt light in a light path of the first optical sensor, the method comprising:

moving the detected member from a first position in which light in the light path of the first optical sensor is not interrupted, then once interrupts light in the light path of the first optical sensor, and then moves to a second position in which light in the light path of the first optical sensor is not interrupted in this order as an amount of sheets stacked on the stacking member decreases according to movement of the stacking member;

storing information regarding that the detected member is in the first position or information regarding that the detected member is in the second position; and transmitting information regarding an amount of sheets stacked on the stacking member based on stored information; and changing stored information based on a detection result of the first optical sensor, wherein second information is information, regarding an amount of sheets stacked on the stacking member and transmitted, of a case where information stored is information regarding that the detected member is in the second position, first information is information, regarding an amount of sheets stacked on the stacking member and transmitted, of a case where information stored is information regarding that the detected member is in the first position, and the second information is information notifying that an amount of sheets stacked on the stacking member is less than an amount of sheets stacked on the stacking member indicated by the first information.

* * * * *